Figure 3:
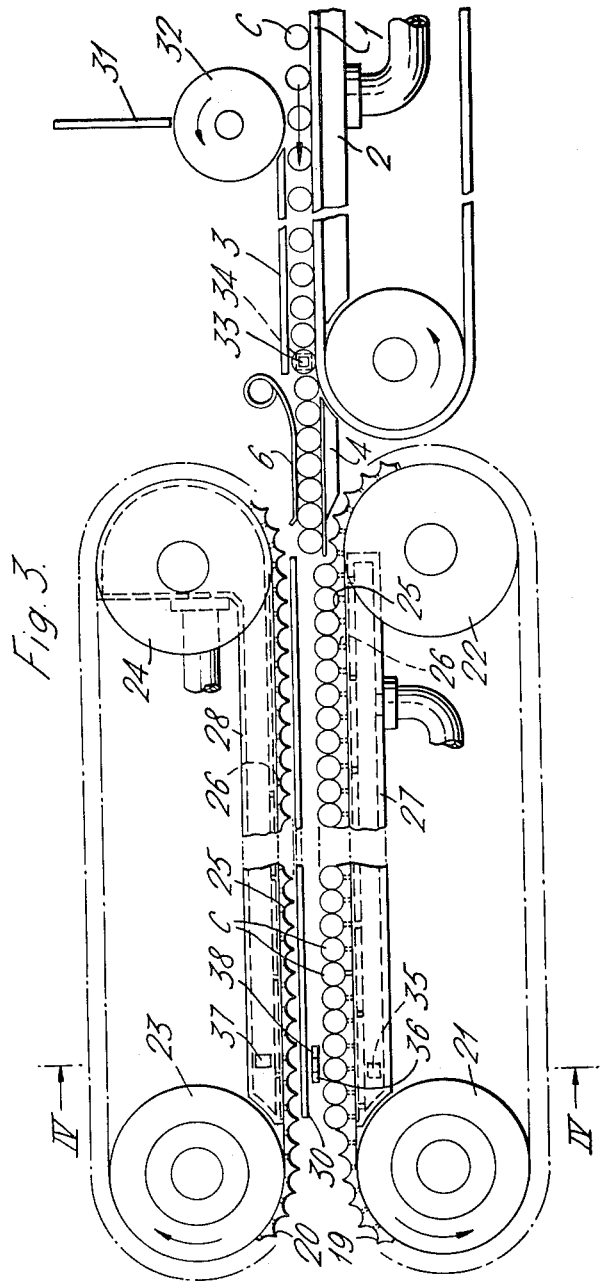

July 26, 1966   D. W. MOLINS   3,262,243
APPARATUS FOR FILLING A CONTAINER WITH ROD-LIKE ARTICLES
Filed Feb. 25, 1963   2 Sheets-Sheet 1
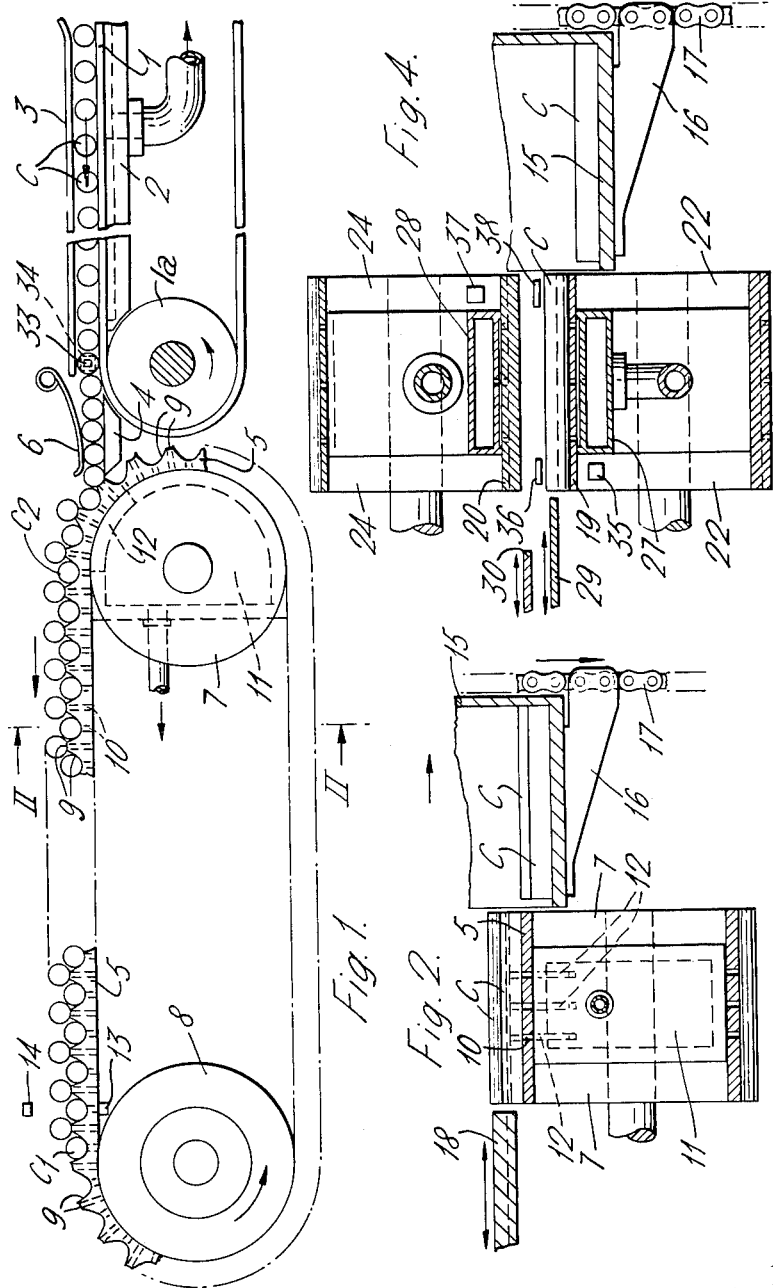
INVENTOR
Desmond W. Molins
By Watson, Cole, Grindle & Watson
ATTORNEYS July 26, 1966   D. W. MOLINS   3,262,243
APPARATUS FOR FILLING A CONTAINER WITH ROD-LIKE ARTICLES
Filed Feb. 25, 1963   2 Sheets-Sheet 2

INVENTOR
Desmond W. Molins

By Watson, Cole, Grindle & Watson
ATTORNEYS

United States Patent Office 3,262,243
Patented July 26, 1966

3,262,243
APPARATUS FOR FILLING A CONTAINER WITH ROD-LIKE ARTICLES
Desmond Walter Molins, Deptford, London, England, assignor to The Molins Organisation Limited, a British company
Filed Feb. 25, 1963, Ser. No. 260,563
Claims priority, application Great Britain, Mar. 8, 1962, 8,972/62
14 Claims. (Cl. 53—150)

This invention concerns improvements in or relating to apparatus for filling a container with rod-like articles (e.g. with cigarettes fed from a cigarette-making machine).

Cigarettes produced on a continuous rod cigarette-making machine are sometimes fed into containers by hand for storage or onward transit to the next stage of manufacturing operation, usually packing. However, with the advent of higher speed cigarette-making machines, various methods and mechanisms have been devised for automatically filling containers with the cigarettes produced.

An object of the present invention is to provide apparatus for filling a container with rod-like articles (e.g. cigarettes) so that the container when filled contains a desired number of rows each containing a desired number of the rod-like articles, comprising means to feed rod-like articles into prepared positions (e.g. into flutes) on a movable conveyor so as to form a row containing a desired number of articles (e.g. so as to form a plurality of rows each containing a desired number of articles) on the conveyor, the row running transversely to the axes of the rod-like articles and in the direction of movement of the conveyor, and transfer means (e.g. a reciprocating pusher) to move the articles contained in the row longitudinally from the conveyor into an adjacent container, whereby apparatus for filling a container with rod-like articles (e.g. cigarettes) so that the container when filled contains a desired number of rows each containing a desired number of the rod-like articles, comprising means to feed rod-like articles successively into prepared positions (e.g. into flutes) on a movable conveyor so as to form a row containing a desired number of articles (e.g. so as to form a plurality of rows each containing a desired number of articles) on the conveyor, the row running transversely to the axes of the rod-like articles and in the direction of movement of the conveyor, and transfer means (e.g. a reciprocating pusher) to move the articles contained in the row longitudinally from the conveyor into an adjacent container, whereby a container can be filled by successively transferring rows of articles from the conveyor into the container.

The conveyor may be arranged so that the row lies in a substantially horizontal plane when the articles are moved from the conveyor into the container, and the container may be arranged to move downwardly after each operation of the transfer means so that a row can be received and supported in the container on the preceding row.

There may be provided detector means (e.g. a photoelectric cell and light source) operative to detect and to stop the conveyor when a row containing a desired number of articles has formed on the conveyor and is at a desired position, so that the conveyor is stationary while the row is transferred therefrom by the transfer means.

The rod-like articles may be fed to the conveyor from a reservoir and there may be provided detector means operative to detect and stop the conveyor when the number of articles contained in the reservoir falls below a certain value, whereby the operation of the apparatus automatically ceases when insufficient articles can be supplied to the conveyor.

The conveyor may comprise an endless conveyor band having prepared article-receiving positions (e.g. flutes) on its conveying surface, and the said prepared positions may be arranged so that a plurality of rows of articles can be formed and carried on the band, and can be simultaneously transferred from the band into the container.

For example, the conveying surface of the band may comprise flutes arranged alternately at two levels to form an upper and a lower tier, so that one row of articles can form on the upper tier and a second row on the lower tier.

The said band may be one of a pair of movable endless conveyor bands, arranged with adjacent substantially horizontal runs one above the other, so that a row of articles, lying in a substantially horizontal plane, can be formed on each of the bands along its conveying surface, there being provided means (e.g. suction means) associated with the band having the upper of the said runs to hold articles to its conveying surface along the said run, whereby articles can be fed to form a row on one band, and, while the said row is being transferred therefrom, to form a further row on the other band, transfer means (e.g. a pair of reciprocating pushers) being provided to transfer articles from each band in turn into the adjacent container.

The said feeding means may comprise a further endless conveyor band (e.g. the catcher band of a cigarette-making machine), arranged to feed the rod-like articles in a direction transverse to their axes to the first said conveyor.

Apparatus in accordance with the invention will now be described by way of example with reference to the accompanying drawings, in which:

FIGURE 1 is a side elevation of one embodiment,
FIGURE 2 is a sectional view on the line II—II of FIGURE 1,
FIGURE 3 is a side elevation of a further embodiment,
FIGURE 4 is a sectional view on the line IV—IV of FIGURE 3.

Referring to FIGURES 1 and 2, cigarettes C are conveyed transversely of their axes from a continuous rod cigarette-making machine by a catcher band 1 which is moved by a driving roller 1a, and through which light suction is applied by means of a suction chamber 2. The cigarettes move in the direction indicated by the arrow beneath a plate 3 and over a bridge 4 on to an endless movable conveyor band 5, a spring 6 being provided to facilitate the transfer to the band 5.

The band 5 passes about rollers 7 and 8 and is movable in the direction indicated by the arrow on the driven roller 8. Flutes 9, forming prepared cigarette-receiving positions, and arranged alternately at two levels, are provided across the width of the band 5, and suction can be applied therethrough by means of ports 10 which can register with a stationary suction chamber 11 positioned between the rollers 7 (see FIGURE 2). Suction can be applied through the ports 10 across an arc defined by slots 12 in the chamber 11. Thus cigarettes C are received from the bridge 4 in successive flutes 9 and suctionally held therein along the arc 12. The two levels of the flutes 9 form an upper and a lower tier so that the cigarettes C, conveyed on the band 5, form, along its upper horizontal run, one row on the upper tier and a second row on the lower tier.

As the leading cigarettes C on the band 5 move between a light source 13 and photo-electric cell 14, the light beam is interrupted and drive of the roller 8 ceases by means of a connection between the cell 14 and the driving mechanism. The source 13 and cell 14 are positioned so that the band 5 stops when the cigarettes between $C_1$ and $C_2$ lie opposite an adjacent container 15 mounted on a support 16 connected to a movable chain 17 (see FIGURE 2), allowance being made for the time lag of operation of the cell 14.

The light source 13 is positioned so that the light beam can pass through the ports 10 to be received by the cell 14, and the cell 14 is of a known type whereby the band 5 is not stopped when the beam is interrupted at frequent regular intervals (i.e. as successive ports 10 pass the source 13), but whereby the band 5 is stopped when the beam is interrupted for a longer time (i.e. when cigarettes C block the ports 10).

A reciprocating pusher 18, suitably shaped to pass through the flutes 9, then operates in a pushing stroke to move the two rows of cigarette between $C_1$ and $C_2$ into the container 15. The pusher 18 is then retracted in a return stroke, the drive of the roller 8 is re-connected and the operation is repeated, two further rows of cigarettes C forming on the conveyor 5.

The container 15 is moved downwardly after a pair of rows of cigarettes have been pushed into it by downward movement of the chain 17, so that it is positioned to receive the two further rows of cigarettes which will be supported by the first said pair of rows. Thus, by the continued operation of the apparatus, the container 15 can be filled with a desired number of rows each containing a desired number of cigarettes. As can be seen from FIGURE 1, the upper row of cigarettes C (from $C_1$ to $C_2$) on the conveyor 5 contains one less cigarette than the lower row, and the spacing of the cigarettes in each row is such that a cigarette in the upper row will be supported by two cigarettes in the lower row when the rows are moved into the container 15. When a further pair of rows are moved into the container, each cigarette of the lower row (with the exception of the end two) will be supported by two cigarettes of the upper of the preceding pair of rows, and will also be in contact with a cigarette of the lower of the preceding pair of rows (which will lie vertically beneath it). Thus the cigarettes C will be disposed in the container 15 in a "honeycomb" fashion.

It will be understood that, when the band 5 is stationary, a reservoir of cigarettes C will build up on the catcher band 1, which is moving continuously, and that when the band 5 is again moved after the rows of cigarettes have been pushed therefrom, the number of cigarettes contained in the reservoir will decrease. Also the number of cigarettes contained in the reservoir will increase when a full container 15 is removed to be replaced by an empty one. The operation of the band 5 is arranged to be such that the average rate of feed of cigarettes thereby is equal to or slightly greater than the rate of feed of cigarettes by the catcher band 1, so as to ensure that the number of cigarettes contained in the reservoir never becomes undesirably large. There may be provided detector means, e.g. a light source 33 and cell 34, to detect when the number of cigarettes in the reservoir falls below a certain minimum value and to stop the drive of the band 5 until the reservoir contains more than the said minimum value, thus ensuring that the operation of the apparatus ceases when there are insufficient cigarettes to supply the band 5 and that rows containing less than the desired number of cigarettes are not transferred to the container 15.

The suction chamber 2 is provided in association with the catcher band 1 to help positively convey the cigarettes C and to ensure that they are correctly aligned (i.e. with axes substantially perpendicular to the direction of movement of the band 1) in the reservoir.

It will be appreciated that, if desired, suction could be applied along the length of the upper run of the band 5 by extending the suction chamber 11 along the run.

It will further be appreciated that other arrangements could be used to define the prepared positions on the conveyor band 5. For example, instead of the flutes 9, the band 5 could be provided with short sloping vanes, the cigarettes being fed so that two are received and conveyed between each successive pair of vanes, and the angle of slope of the vanes being such that the upper cigarette between a pair of vanes is positioned centrally between the two lower cigarettes between successive vane pairs (i.e. so that the location of the cigarettes on the conveyor 5 is substantially as shown in FIGURE 1).

Also the band 1 could be provided with electrostatic pads instead of applying suction therethrough, the pads acting to positively move the cigarettes C and align them as previously described.

FIGURES 3 and 4, in which like parts are indicated by like reference numerals, illustrate a further embodiment. Two endless movable conveyor bands 19 and 20, passing about rollers 21 and 22, and 23 and 24 respectively, are arranged with adjacent substantially horizontal runs positioned one above the other. Each of the bands 19 and 20 comprises flutes 25 across its width and spaced so that cigarettes positioned in successive flutes are in contact with each other. Suction can be applied through the flutes 25 by means of ports 26 which can register with stationary suction chambers 27 and 28 which extend along the said horizontal runs of the bands 19 and 20 respectively.

The operation of the apparatus shown in FIGURES 3 and 4 is as follows:

Cigarettes C are fed by the catcher band 1 into successive flutes 25 on the lower conveyor band 19, through which suction is applied and which is moved by driving the roller 21 in the direction indicated by the arrow. Thus a single row of cigarettes C is formed on the band 19 and when the leading cigarettes pass a certain point, detector means comprising a light source 35 and photo-electric cell 36 operate to stop the band 19 as described with reference to FIGURES 1 and 2.

The parts are then in the position shown in FIGURE 3, and when the band 19 is stopped suction is arranged to be applied through the chamber 28 and through the upper band 20, and simultaneously to be cut off through the chamber 27 and lower band 19 e.g. by means of rotary valves (not shown). The band 20 is moved by driving the roller 23 in the direction shown by the arrow, and, by the action of suction, cigarettes C are caused to be transferred from the bridge 4 into the flutes 25 on the moving band 20 so that a row of cigarettes builds up thereon. During this time a reciprocating pusher 29 operates to push the row of cigarettes C from the lower band 19 into the adjacent container 15.

When a row containing the desired number of cigarettes C has formed on the upper band 20, it is stopped by means of a further detector device, comprising a light source 37 and photo-electric cell 38, and the row of cigarettes is pushed into the container 15 by means of a further reciprocating pusher 30. After the row has been removed from the band 20 suction therethrough is cut off, suction being re-applied through the lower band 19, which is again moved and on which a further row of cigarettes C is formed. The container 15 is moved downwardly by movement of the chain 17 to a position at which the next row of cigarettes C from the lower band 19 can be received on top of the previous row from the upper band 20.

The relative positions at which the bands 19 and 20 are stopped are arranged to be such that cigarettes received in the container 15 from a row on the upper band 20 are supported on two cigarettes of the preceding row from the lower band 19 (i.e. the relative stopping positions of the bands are offset by half a pitch of a cigarette).

It will be appreciated that by this arrangement the feed of cigarettes to the bands 19 and 20 can be substantially continuous. However, a reservoir of cigarettes is provided on the catcher band 1, there being provided detector means as previously to stop the bands 19 and 20 automatically when insufficient cigarettes are contained in the reservoir to supply the bands correctly. Further, when a full container 15 is removed to be replaced by an empty one the reservoir will build up and for this reason a wall 31 and refuser roller 32 are provided above the catcher band 1 to form a hopper and to aid in the feed of cigarettes from the reservoir.

It will also be appreciated that, if desired, the pushers 29 and 30 could be replaced by a single pusher arranged to move upwardly and downwardly after alternate pushing strokes so as to be capable of pushing cigarettes from both the bands 19 and 20.

What I claim as my invention and desire to secure by Letters Patent is:

1. Apparatus for filling a container with rod-like articles, so that the container when filled contains a predetermined number of rows each containing a predetermined number of the rod-like articles, comprising a movable conveyor having prepared article-receiving positions in which rod-like articles can be received and carried on the conveyor to form a row containing a predetermined number of articles, the row running transversely to the axes of the articles, means to move the conveyor in a direction transverse to the axes of articles carried thereon, so that the conveyor is moved as articles are received thereon, detector means operative to detect and to stop the conveyor when a row containing a predetermined number of articles has formed thereon and is at a predetermined position, and to restart the conveyor when said row has been removed therefrom, means to feed rod-like articles at a feeding position successively into said prepared positions as the latter move past the feeding position, so as to form said row, container-support means to support a container at a positon opposite said row when the latter is in said desired position, and transfer means to move the articles contained in said row at said predetermined position longitudinally from the conveyor into a container thus supported, whereby a container can be filled by successively transferring rows of articles from the conveyor into the container.

2. Apparatus for filling a container with rod-like articles, so that the container when filled contains a predetermined number of rows each containing a predetermined number of the rod-like articles, comprising a movable endless conveyor band whose conveying surface defines prepared article-receiving positions in which rod-like articles can be received and carried on the band to form a row containing a predetermined number of articles, the row running transversely to the axes of the articles, support means to support the conveyor band so that it has a substantially horizontal run along which a row of articles carried thereon can lie in a substantially horizontal plane, feeding means to feed rod-like articles successively at a feeding position into said prepared positions on the conveyor band to form a row containing a predetermined number of articles thereon, means to move conveyor band, in a direction transverse to the axes of articles carried thereon, past said feeding position and to stop the band when said row of articles formed thereon is at a predetermined position along said horizontal run, container-support means to support a container at a position adjacent said horizontal run of the band and opposite said row when the latter is in said predetermined position, transfer means to move the articles contained in said row longitudinally from the conveyor band into a container thus supported, and means to move said container-support means downwardly after each operation of the transfer means so as to lower the container so that a row of articles can be received and supported in the container on a preceding row, whereby a container can be filled by successively transferring rows of articles from the conveyor into the container.

3. Apparatus for filling a container with rod-like articles, so that the container when filled contains a predetermined number of rows each containing a predetermined number of the rod-like articles, comprising a movable endless conveyor having prepared article-receiving positions in which rod-like articles can be received and carried on the conveyor to form a plurality of rows, each containing a predetermined number of articles, and arranged one row above another, the rows running transversely to the axes of the articles, and in the direction of movement of the conveyor, said conveyor having a substantially horizontal run along which rows of articles carried thereon can lie in substantially horizontal planes, feeding means to feed rod-like articles successively at a feeding position into said prepared positions on the conveyor, means to move the conveyor, in a direction transverse to the axes of articles carried thereon, past said feeding position to receive articles which form said plurality of rows on the conveyor, and to stop the conveyor when said rows are at a predetermined position along said horizontal run, container-support means to support a container at a position opposite said rows when the latter are in said desired position, transfer means to transfer the articles contained in said rows longitudinally from the conveyor into a container thus supported, and means to move said container-support means so as to lower a container supported thereby after each operation of the transfer means, so that rows of articles can be received in the container over preceding rows, whereby a container can be filled by successively transferring rows of articles from the conveyor into the container.

4. Apparatus as claimed in claim 3, wherein said conveyor comprises a conveyor band whose conveying surface defines flutes arranged alternately at two levels to form an upper and a lower tier, so that one row of articles can form on the upper tier and a second row on the lower tier, said flutes constituting said prepared positions.

5. Apparatus for filling a container with rod-like articles, including a conveyor having a substantially horizontal part to receive succesive rows of articles on its upper surface, a further conveyor located above the first said conveyor and having a substantially horizontal part to receive successive rows of articles on its undersurface, and means to hold said articles to said undersurface, said two horizontal parts being spaced apart, movable support-means alongside said conveyors to support a container, means to feed articles to one of said conveyors to form a row on its horizontal part, and then to feed articles to the other of said conveyors to form a row on its horizontal part, means to move each of said conveyors in a direction transverse to the axes of articles carried thereon, and to stop each conveyor when a row of articles on its said horizontal part is at a predetermined position opposite said container, means to transfer each such row in succession into said container, and means to move said support-means stepwise downwardly so that rows of articles can be received in the container over preceding rows.

6. Apparatus as claimed in claim 5, including pusher-means arranged to push said rows of articles, in the direction of the axes of the articles, from one conveyor while articles are being formed into a row on the other conveyor.

7. Apparatus for filling a container with rod-like articles, so that the container when filled contains a predetermined number of rows each containing a predetermined number of the rod-like articles comprising a pair of movable endless conveyors one above the other and each having prepared article-receiving positions in which rod-like articles can be received and carried on the conveyor to form a row containing a predetermined number of articles, the row running transversely to the axes of the articles and in the direction of movement of the row by the conveyor, each conveyor having a substantially horizontal run along which said row of articles can lie in a substantially horizontal plane, the conveying surfaces of the conveyors facing one another along said runs, holding means associated with the upper one of the two conveyors to hold articles to its conveying surface therealong, container-support means to support a container at a position adjacent said runs, transfer means to transfer articles contained in a row longitudinally from each conveyor, at a desired position along its said run, into a container thus supported, feeding means to feed rod-like articles into said prepared positions on the conveyors, and means to move the conveyors intermittently in timed relationship with the operation of the transfer means so that articles can be received to form a row containing a predetermined number of articles on one conveyor, and the conveyor stopped when said row is at said predetermined position, and, while the articles in said row are being transferred, articles can be received on the other conveyor to form a row containing a desired number of articles, the apparatus further comprising means to move said container-support means so as to lower a container supported thereby after the container has received a row of articles transferred from the conveyor having the upper of said runs, whereby a container can be filled by transferring rows of articles thereinto from each of the conveyors in turn, a row of articles being received and supported in the container on a preceding row.

8. Apparatus as claimed in claim 7, wherein said conveyors comprise conveyor bands whose conveying surfaces define flutes, which constitute said prepared positions, and wherein said holding means comprises suction means.

9. Apparatus as claimed in claim 7, comprising detector means associated with each of the conveyors and operative to detect, and to stop a conveyor, when a row containing said predetermined number of articles has formed on the conveyor and is at the said predetermined position.

10. Apparatus as claimed in claim 3, comprising detector means operative to detect and to stop the conveyor, when said plurality of rows of articles on the conveyor are at said predetermined position and to restart the conveyor when the articles contained in said rows have been removed therefrom.

11. Apparatus for filling a container with rod-like articles, comprising a conveyor having a substantially horizontal part on which articles can be received to form a row on its upper surface, means to move said conveyor in a direction transverse to the axes of articles carried thereon, a further conveyor located above said first conveyor and having a substantially horizontal part on which articles can be received to form a row on its undersurface, and means to hold said articles to said undersurface, said two horizontal parts being spaced apart, means to move said further conveyor in a direction transverse to the axes of articles carried thereon, means to feed articles to one of said conveyors to form a row on its horizontal part, and then to feed articles to the other of said conveyors to form a row on its horizontal part, detector means operative to detect, and to stop said first conveyor, when a row of articles on its horizontal part is at a predetermined position, and operative to detect and to stop said further conveyor when a row of articles on its horizontal part is at a predetermined position, means to support a container opposite said predetermined positions, and means to transfer rows of articles alternately from said first conveyor and said further conveyor into said container.

12. Apparatus for filling a container with rod-like articles, comprising a conveyor having a substantially horizontal part on which articles can be received to form a row on its upper surface, a further conveyor having a substantially horizontal part, located above and spaced from the horizontal part of said first conveyor on which articles can be received to form a row on its undersurface, and means to hold said articles to said undersurface, means to support a container at a position at which it can receive articles from said conveyors, means to feed articles to each of said conveyors, means to move each of said conveyors in a direction transverse to the axes of articles carried thereon and to stop each conveyor when a row of articles on its said horizontal part is at a predetermined position opposite said container, and means to transfer articles in rows from said conveyors into said container.

13. Apparatus as claimed in claim 12, comprising detector means associated with each of said conveyors operative to detect and to stop a conveyor, when a row of articles on its said horizontal part is at said predetermined position.

14. Apparatus for filling a container with rod-like articles, comprising a first conveyor and a second conveyor, each having prepared article-receiving positions in which rod-like articles can be received and carried to form a row running transversely to the axes of the articles, said first conveyor having a substantially horizontal part on which articles can be carried on its upper surface, and said second conveyor having a substantially horizontal part on which articles can be carried on its undersurface, and means to hold articles to said undersurface, said horizontal part of the second conveyor being located above and spaced from the said horizontal part of the first conveyor, means to support a container at a position at which it can receive articles from said first and second conveyors, means to feed articles to said first and second conveyors, means to move said first and second conveyors in a direction transverse to the axes of articles carried thereon, and to stop each conveyor when a row of articles on its horizontal part is at a predetermined position opposite said container, and means to transfer articles in rows from said first and second conveyors into said container.

References Cited by the Examiner

UNITED STATES PATENTS

| | | | |
|---|---|---|---|
| 1,926,554 | 9/1933 | Muller | 53—150 X |
| 2,053,418 | 9/1936 | Braren | 53—62 |
| 2,982,531 | 6/1959 | Herbert | 198—35 |
| 2,909,269 | 10/1959 | Porterfield. | |
| 3,089,297 | 5/1963 | Craig et al. | 53—150 X |

FRANK E. BAILEY, *Primary Examiner.*

B. STICKNEY, *Examiner.*

A. E. FOURNIER, P. H. POHL, *Assistant Examiners.*